3,244,751
HYDRINDACENE COMPOUNDS
Ernst T. Theimer, Rumson, and Jack H. Blumenthal, New Monmouth, N.J., assignors to International Flavors & Fragrances Inc., New York, N.Y., a corporation of New York
Filed Feb. 23, 1962, Ser. No. 175,083
4 Claims. (Cl. 260—592)

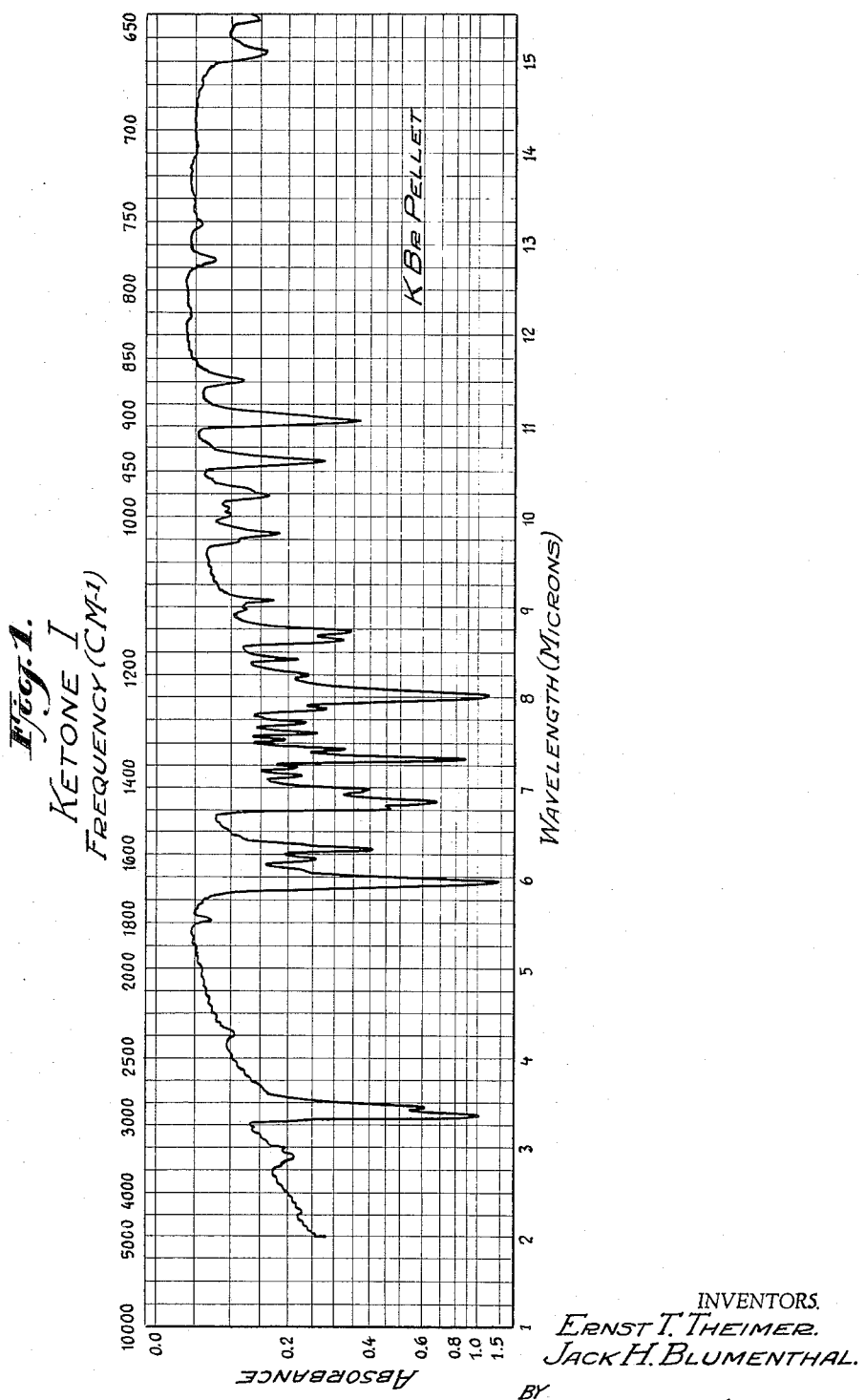

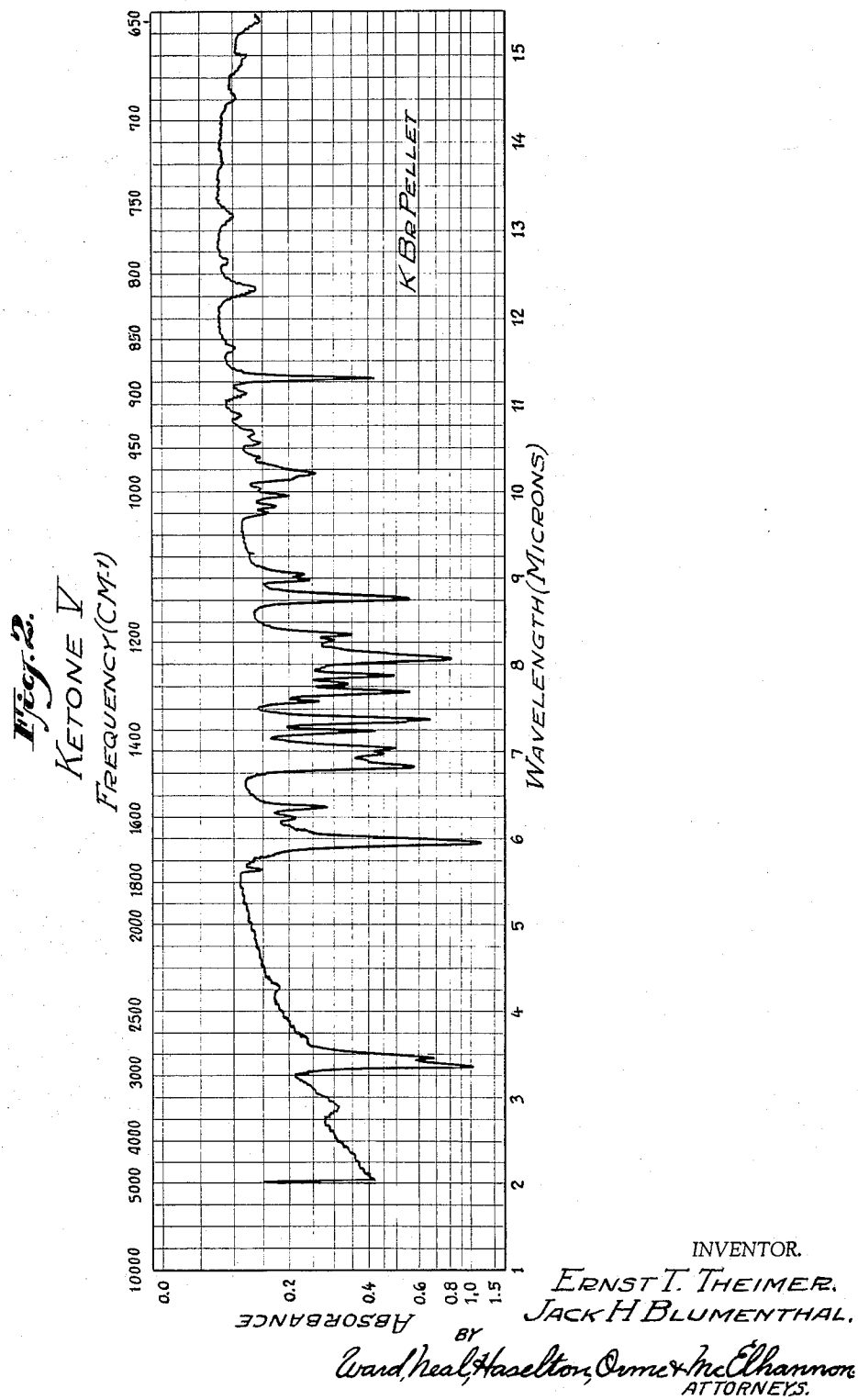

This invention relates to acetyl hydrindacene compounds, which are perfumes, intermediates thereof, and processes for producing same.

The principal object of the invention accordingly is to produce such compounds and intermediates thereof, and to provide a simple, efficient process for the production thereof.

The invention accordingly comprises the novel product and intermediates thereof, as well as the process and steps of process according to which the product is manufactured, the specific embodiments of which are described hereinafter by way of example, and in accordance with which we now prefer to practice the invention.

We have found in accordance with our invention, the compound 4-acetyl 1,1,6,6-tetramethyl-as-hydrindacene (I) and the compound 4-acetyl-1,1,7,7-tetramethyl-s-hydrindacene (V), both of which are perfumes.

In carrying out the process of our invention for making these compounds, α,α'-dichloro-m-xylene is reacted with the Grignard reagent formed from methallyl chloride to produce m-bis-(3-methyl-3-butenyl)-benzene (II). Upon cyclizing this latter compound a mixture of two hydrindacenes, namely 1,1,6,6-tetramethyl-as-hydrindacene (III) and 1,1,7,7-tetramethyl-s-hydrindacene (IV), which are isomers, are formed and may be separated by fractional distillation. The asymmetrical isomer is acetylated to form the ketone I, which is a strong musk. The reaction is as follows:

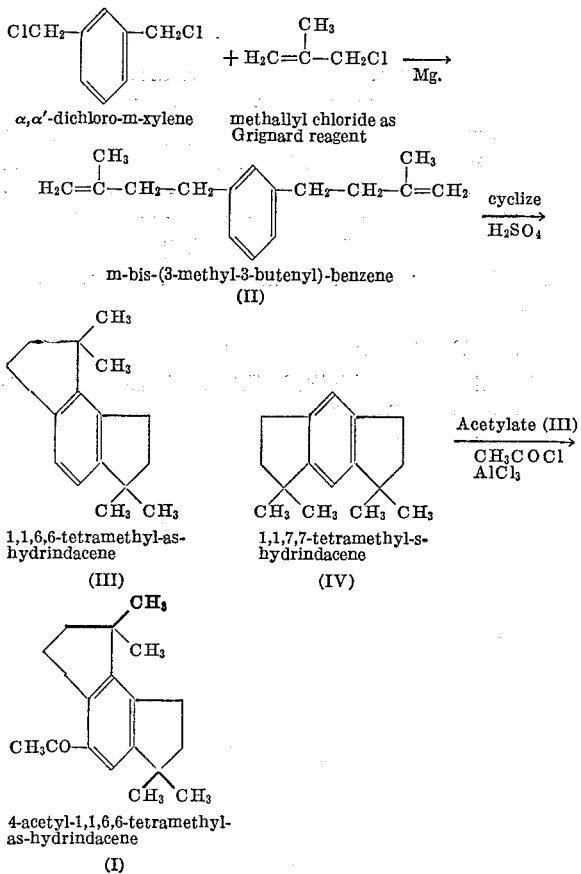

Conversely the mixture of the two hydrindacenes may be acetylated and the resulting ketone separated by fractional crystallization. Ketone V derived from the symmetrical hydrindacene (IV) by acetylation is also a musk, but weaker than I. The reaction is:

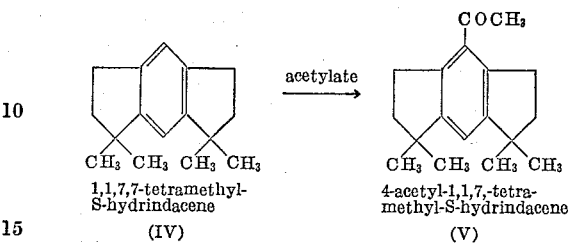

NMR (Nuclear Magnetic Resonance) absorption data confirmed the structures of the hydrindacenes and ketones as described above, and are as follows:

Ketone I—4-acetyl-1,1,6,6-tetramethyl-as-hydrindacene

| Multiplicity: | Tau values |
|---|---|
| Doublet | 8.76, 8.72 |
| Multiplet (3 pairs of doublets, with centers of gravity indicated) | 8.23, 8.11, 8.00 |
| Singlet | 7.53 |
| Multiplet | 7.20, 7.08, 7.03, 6.97, 6.91 |
| Singlet | 2.85 |

Ketone V—4,acetyl-1,1,7,7-tetramethyl-s-hydrindacene

| Multiplicity: | Tau value |
|---|---|
| Singlet | 8.78 |
| Triplet | 8.10 |
| Singlet | 7.59 |
| Triplet | 7.06 |
| Singlet | 3.20 |

The following are examples of the process as we now prefer to practice it. It is to be understood that the invention is not to be considered as limited to the examples except as indicated in the appended claims.

*Example 1.—Production of m-bis-(3-methyl-3-butenyl)-benzene*

In a dry 3-neck flask which had been flushed with nitrogen was placed 71 grams of magnesium turnings and 730 grams of dry ether. To this was added 16 grams of redistilled methallyl chloride with stirring and the flask was cooled to 0° C. A solution of 200 grams of methallyl chloride in 1130 grams of ether was added to the flask over a period of seven hours with stirring at 0 to 3° C. The mixture was stirred for an additional eight hours and then stood overnight at room temperature. The methallyl Grignard mixture was transferred to another flask with nitrogen. A solution of 106 grams of α,α'-dichloro-m-xylene in 450 grams of dry ether was added to the Grignard mixture over a period of 1.5 hours at reflux temperature. The reaction mixture was refluxed for another three hours. The reaction mixture was then decomposed with saturated ammonium chloride solution, the aqueous layer separated and extracted once with ether. The combined ether layers were washed once with 10% ammonium chloride solution and the solvent stripped off. The residue, m-bis-(3-methyl-3-butenyl)-benzene (II) weighed 136 grams and was fractionated at 0.6 mm. through a Vigreaux colum.

*Example 2.—Production of 1,1,6,6-tetramethyl - as - hydrindacene and 1,1,7,7-tetramethyl-s-hydrindacene*

To 300 grams of 88% sulfuric acid was added with with good stirring 100 grams of m-di-isopentenyl benzene (II) (also known as m-bis-(3-methyl-3-butenyl)-benzene) (obtained as in Example 1) over a four hour period while maintaining the temperature at 8 to 10° C. Stirring was continued for another two hours at 8 to 10° C. after the addition was completed. The reaction mixture was poured into 300 grams of ice and separated with the aid of 50 grams of benzene. The aqueous layer was extracted with 100 cc. of benzene and the combined organic layers were washed with salt solution, 10% sodium carbonate and salt solution. The solvent was stripped off when under vacuum and the residue distilled through a Vigreaux column. There was obtained 59 grams of distillate, B.P. 100–105° C. at 0.5 mm. The distillate was fractionated through a high plate packed column and was separated into a solid and liquid fraction. The infrared absorption curve of the solid (melting point 45 to 47° C. after recrystallization from ethanol) indicated that it was a 1,2,4,5-tetra substituted benzene, and therefore was assigned structure IV. The IR of the liquid fraction indicated it to be a 1,2,3,4-tetra substituted benzene, and therefore it was assigned structure III.

*Example 3.—Production of 4-acetyl-1,1,6,6-tetramethyl-as-hydrindacene*

To a solution of 44 grams of the asymmetrical hydrindacene (III) as obtained in Example 2, 120 grams of 2-nitro-propane and 22 grams of acetyl chloride was added 33 grams of anhydrous aluminum chloride (finely divided) in small proportions over a two hour period while maintaining the temperature at 0 to 5° C. The reaction mixture was stirred at 0 to 5° C. for an additional two hours and then poured into a cold solution of 44 grams of concentrated hydrochloric acid and 160 gm. of water. After stirring for fifteen minutes the mixture was separated and the organic layer washed successively with concentrated HCl (twice), 10% salt solution, 10% $Na_2CO_3$ and salt solution until neutral to litmus. The solvent was distilled off under vacuum and the residue distilled through a short column at 0.5 mm. The distillate solidified on standing and was recrystallized twice from aqueous ethanol. The ketone, 4-acetyl-1,1,6,6-tetramethyl-as-hydrindacene, melted at 94–95° C., showed only one peak by VPC and had a strong musk odor.

*Example 4.—Production of 4-acetyl-1,1,7,7-tetramethyl-s-hydrindacene*

To a solution of 74 g. of the symmetrical hydrindacene (IV) as obtained in Example 2, 200 g. of 2-nitropropane and 37 g. of acetyl chloride was added 55 g. of aluminum chloride in small portions over a two hour period while maintaining the temperature at 0 to 5° C. The reaction mixture was worked up as in Example 3. The ketone, 4-acetyl-1,1,7,7-tetramethyl-s-hydrindacene, melted at 57° C. after recrystallization, showed only one peak by VPC, and had a weak musk odor.

All pressures herein are given in mm. of mercury.

In the accompanying drawings forming part of this application:

FIGURE 1 is an infra red chart of ketone I, and

FIGURE 2 is an infra red chart of ketone V.

We claim:

1. The compound 4-acetyl-1,1,6,6-tetramethyl-as-hydrindacene having the formula

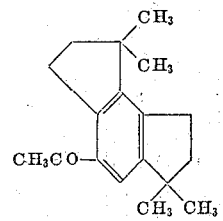

2. The compound 4-acetyl-1,1,7,7-tetramethyl-s-hydrindacene having the formula

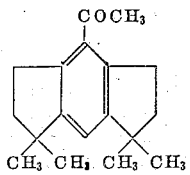

3. The compound m-bis-(3-methyl-3-butenyl)-benzene having the formula

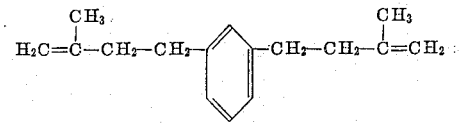

4. The compound 1,1,6,6-tetramethyl-as-hydrindacene having the formula

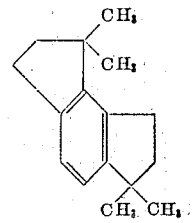

References Cited by the Examiner

UNITED STATES PATENTS

| | | | |
|---|---|---|---|
| 2,564,077 | 8/1951 | Proell | 260—671 |
| 2,752,404 | 6/1956 | Polak | 260—592 X |
| 2,848,512 | 8/1958 | Schmerling | 260—668 |
| 3,042,664 | 7/1962 | Price | 260—668 X |

OTHER REFERENCES

Arnold et al.: J. Am. Chem. Soc., vol. 67, pp. 1265-7 (1945).

LEON ZITVER, *Primary Examiner.*

LORRAINE A. WEINBERGER, DANIEL D. HORWITZ, *Assistant Examiners.*